Figure 1:
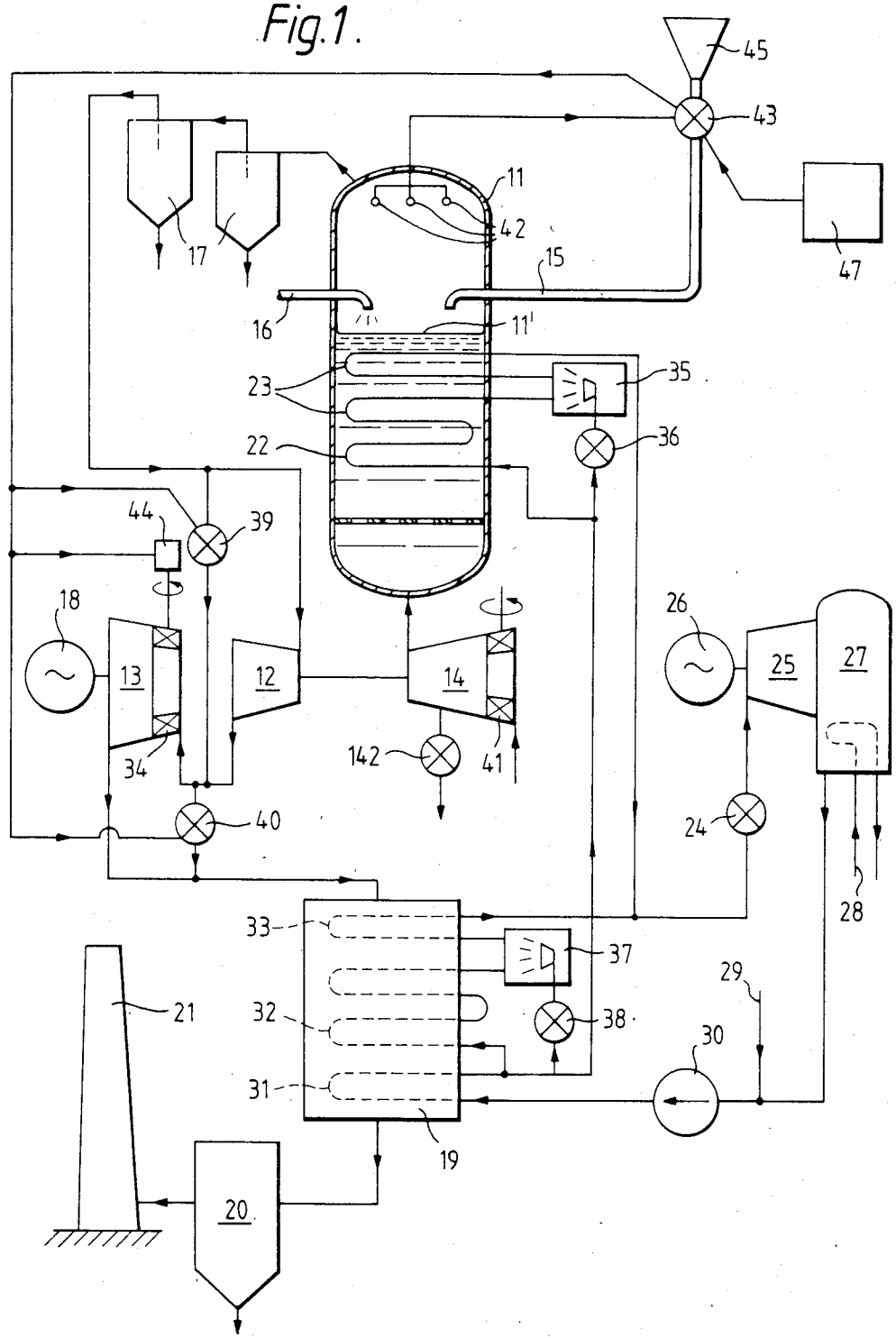

United States Patent [19]

Hyde et al.

[11] Patent Number: 4,660,375

[45] Date of Patent: Apr. 28, 1987

[54] POWER-GENERATION PLANT AND METHOD

[75] Inventors: John A. C. Hyde, Leicestershire; Jack Broughton, Derbyshire, both of England

[73] Assignee: The English Electric Company Limited, England

[21] Appl. No.: 753,700

[22] Filed: Jul. 10, 1985

Related U.S. Application Data

[63] Continuation of Ser. No. 511,879, Jul. 8, 1983, abandoned.

[30] Foreign Application Priority Data

Sep. 27, 1982 [GB] United Kingdom ............... 8227543

[51] Int. Cl.⁴ .......................... F02C 9/00; F02C 3/10; F02C 6/00
[52] U.S. Cl. ................... 60/39.03; 60/39.161; 60/39.183
[58] Field of Search ............... 60/39.03, 39.04, 39.161, 60/39.2, 39.24, 39.182; 431/7, 170; 110/244, 245

[56] References Cited

U.S. PATENT DOCUMENTS 4,335,683 6/1982 Criswell et al. ..................... 110/245

FOREIGN PATENT DOCUMENTS

| 760962 | 4/1954 | Fed. Rep. of Germany ... 60/39.161 |
| 2812237 | 10/1978 | Fed. Rep. of Germany ... 60/39.161 |
| 955298 | 4/1964 | United Kingdom . |
| 2049816 | 12/1980 | United Kingdom ............. 60/39.161 |
| 2076062 | 11/1981 | United Kingdom . |

Primary Examiner—Louis J. Casaregola
Assistant Examiner—Timothy S. Thorpe
Attorney, Agent, or Firm—Kirschstein, Kirschstein, Ottinger & Israel

[57] ABSTRACT

Power generating plant comprising a pressurized fluidized bed combustor (PFBC) (11) in combination with a gas turbine (12,13) and associated compressor (14), is enabled to operate over an extended range of load and to respond rapidly to substantial load changes by arranging for such range and changes to be achievable while maintaining the PFBC at substantially constant temperature and varying, instead, the gas pressure in and mass flow rate through the PFBC. For effecting the required changes, the gas turbine and/or the compressor are provided with variable geometry, in the form of variable inlet or inter-stage guide vanes (34) and/or interstage bypass or blow-down valves (39,40).

14 Claims, 3 Drawing Figures

POWER-GENERATION PLANT AND METHOD

This is a continuation of application Ser. No. 511,879, filed July 8, 1983, now abandoned.

This invention relates to power-generation plant of the kind which comprises a pressurised fluidised bed combustor (PFBC) in combination with a gas turbine and associated compressor, and to a method of operating such plant.

Power-generating plant of this kind, in which the PFBC is employed essentially as the combustor for the gas turbine by which, in turn, it itself is pressurised, is generally accepted as offering a higher full-load efficiency than conventional pulverised-fuel power stations and also as providing a better means of meeting current and anticipated future controls on exhaust emission; but known designs suffer from two major drawbacks, namely a severely limited power turn-down capability and an inability to respond rapidly to rapid demand changes without the plant being subjected to severe and ultimately destructive thermal stress.

A fundamental feature of the PFBC is that its combustion bed must be cooled to prevent the bed temperature rising above the sintering or melting temperature of the ash of the fuel used, and this is achieved by the provision in the bed of cooling tubes through which cooling water or air is passed to abstract an appropriate proportion of the total heat release, in the form of steam or heated air, whilst maintaining the bed at an appropriately high temperature to ensure efficient combustion. Since the bed temperature rises to temperatures of about 1000° C., the PFBC needs to be lined with ceramic or other refractory material both to reduce heat losses and to protect structural metal of the PFBC; and similar thermal insulation is also required in hot ducting leading from the PFBC and in a hot clean-up system which is interposed between the PFBC and the gas turbine inlet to remove ash particles from the gaseous combustion products before these enter the turbine. The PFBC will only operate efficiently over a limited temperature range of about 200° C. (between ash sintering and poor combustion) and this, due to the inherent characteristics of conventional gas turbines, would lead (as already mentioned) to a severely limited power turn-down capability of only about 2:1. Furthermore, the presence of the thermal insulation at high temperatures imposes severe limitations on the rate at which the PFBC operating temperature can be raised or lowered, typically to a maximum rate of about 170° C. per hour, which would result in the plant taking over an hour to accept load changes even over the limited permissible range; and most electrical generating systems, in particular, require a much more rapid response to changes in demand. In particular, a sudden loss of electrical load would require a rapid shut-down of the PFBC to avoid gas turbine and generator overspeed, and the consequent high rate of temperature drop would subject the insulation to severe thermal shock of a kind which would be damaging and, ultimately, destructive.

It is an object of the invention to provide power-generating plant of the kind which comprises a PFBC in combination with a gas turbine and associated compressor, and a method of operating such plant, which enable an extended load range, and an inherent capacity to respond rapidly to substantial load changes, to be achieved while the bed temperatures of the PFBC is maintained within safe limits.

In power plant comprising:
(a) a pressurised fluidised bed combustor provided with a combustion gas outlet and a compressed air inlet,
(b) fuel supply means for delivering fuel to said pressurised fluidised bed combustor at a variable rate,
(c) control means for controlling the delivery of fuel from the fuel supply means to the combustor in dependence upon the temperature in the combustor and tending to maintain said temperature at a pre-set demand value,
(d) a high pressure gas turbine the inlet of which is linked to the combustion gas outlet of the combustor,
(e) a low pressure gas turbine the inlet of which is linked to the outlet of said high pressure gas turbine,
(f) means for varying the relative power outputs of said high and low pressure gas turbines, and
(g) an air compressor driven by the high pressure turbine for feeding compressed air to said compressed air inlet, the present invention provides a method of changing the total useful power output of the power plant to a new power output wherein the relative power output of said high and low pressure gas turbines is adjusted in conjunction with the fuel feed rate to said combustor so as to keep the temperature in the combustor within predetermined safe limits and to achieve an equilibrium temperature within the combustor at said new power output which is substantially equal to said pre-set demand temperature.

Preferably said means comprises a variable orientation inlet-guide vane system at the inlet of the low pressure turbine which is effective to adjust the interturbine pressure and hence the relative power output of the high and low pressure turbines.

According to a further aspect of the invention, power plant comprises:
(a) a pressurised fluidised bed combustor provided with a combustion gas outlet and a compressed air inlet,
(b) temperature sensing means for sensing the temperature in said combustor,
(c) variable delivery fuel supply means for supplying fuel to said combustor,
(d) a high pressure gas turbine connected to said combustion gas outlet,
(e) a low pressure gas turbine connected to the outlet of said high pressure gas turbine,
(f) first control means for varying the relative power output of said high and low pressure gas turbines, and
(g) an air compressor drivingly connected to the output shaft of the high pressure gas turbine for supplying compressed air to said compressed air inlet, wherein the improvement comprises further control means connected to said temperature sensing means, first control means and variable delivery fuel supply means for isothermally adjusting the total useful power output of the power plant.

Figure 2:
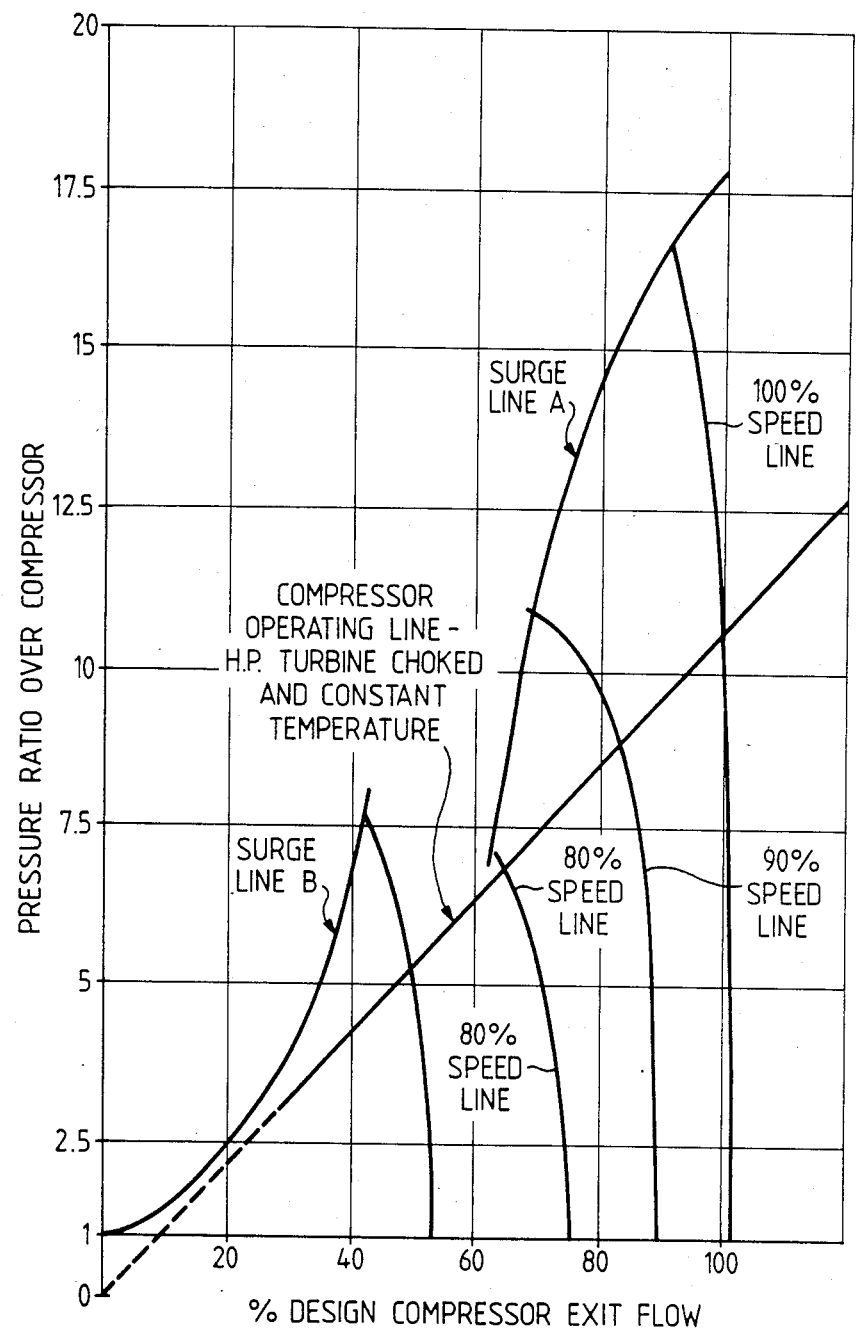
Figure 3:
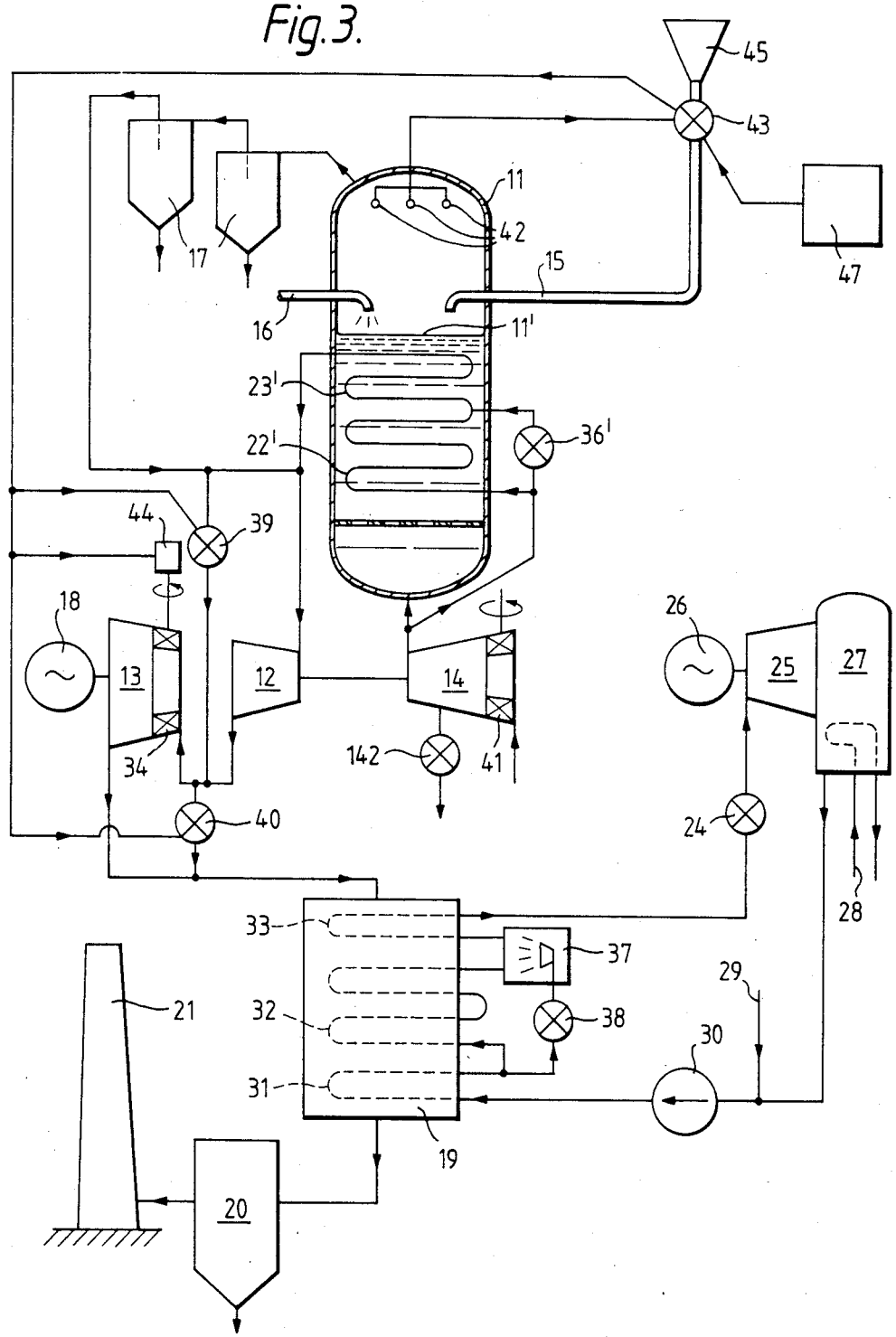

The invention will be more fully understood from the following description with reference to the accompanying drawings, in which:

FIG. 1 is a schematic diagram of a first embodiment of power-generating plant according to the invention and operated in accordance therewith, FIG. 2 is a diagram illustrating performance, under varying conditions, of an air compressor comprised in the power-generating plant of FIG. 1, and FIG. 3 is a schematic diagram of a second embodiment of power-generating plant according to the invention and operated in accordance therewith.

The power-generating plant represented by FIG. 1 comprises a pressurised fluidised bed combustor 11 (PFBC) in combination with a high-pressure gas turbine 12 and a low-pressure gas turbine 13. The high-pressure gas turbine 12 drives an associated air compressor 14, which feeds compressed air to the lower part of the PFBC 11, where the upward air flow fluidised a combustion bed 11' and supports combustion therein of fuel supplied to the bed via a fuel feed line 15. In addition to the fuel feed line 15, the PFBC 11 may, as shown, be provided with a further feed line 16 for introducing any desired chemical treatment feed in order to influence or control the nature and composition of the products of combustion. The gaseous products of combustion are fed from the PFBC to the high-pressure gas turbine 12 via a hot clean-up system 17, represented schematically in FIG. 1 as a pair of cyclone separators connected in series, which removes all ash particles above a threshold which is acceptable in practice in terms of turbine erosion.

The exhaust from the high-pressure gas turbine 12 is fed to the low-pressure gas turbine 13 (loaded by an electrical generator 18) and thence through a waste-heat recovery unit 19 and a cold clean-up system 20 before being finally emitted into the atmosphere via an outlet stack 21.

Part of the heat generated by the combustion in the PFBC 11 is absorbed in the turbines 12 and 13, respectively driving the compressor 14 and the generator 18, but for control of the temperature in the bed 11' a part of such heat is abstracted from the fluidised bed 11' by means of cooling tubes 22 and 23 constituting respectively the evaporator and super-heating sections of a steam-raising boiler from which the steam is fed via a steam valve 24 to a steam turbine 25 driving an electrical generator 26. Steam exhausted from the steam turbine 25 is passed through a condenser 27 (provided with a separate cooling-water circuit 28) and returned (together with any required make-up water from a supply line 29) by a feed water pump 30 to the steam-raising tubes 22 and 23 in the fluidised bed 11'. Preferably, and as shown, the waste-heat recovery unit 19 is constituted by a steam-raising boiler having economiser, evaporator and superheater sections 31, 32 and 33 respectively in series and generating steam which is also fed to the steam turbine 25; and in that case the feed water from the pump 30 may, as shown, be fed first to the economiser section 31 whereafter a part is fed to the sections 32 and 33 of the unit 19 but the remainder is fed to the tubes 22 and 23 in the fluidised bed 11'.

As described thus far, the plant shown in FIG. 1 is substantially of known kind and subject to the shortcomings described above arising from the severe restrictions imposed on allowable changes and rates of change of the temperature within the PFBC 11 and the hot clean-up system and the ducting connecting these to one another and to the high pressure turbine 12 because of the susceptibility to thermal shock of the insulation provided and because of the relatively narrow band of allowable temperatures in the bed 11'.

However, the invention provides for a greatly improved flexibility of response to changes in power output requirements, with only minimal variations of temperature within the PFBC 11, hot clean-up system 17 and associated ducting. To this end, the gas turbine part of the system is provided with means for adjusting the relative power conversion in the high and low pressure turbines, which means as illustrated in FIG. 1, takes the form of a variable-orientation inlet guide-vane system 34 at the inlet of low-pressure turbine 13 and serves to vary the inter-turbine pressure. It should be noted that the total pressure drop across turbines 12 and 13 is substantially constant for a given gas flow rate through them, irrespective of the orientation of the guide vanes. Since the relative power outputs of the turbines will depend on the respective pressure drops across them, the relative power conversion in the turbines will vary with the interturbine pressure, which is a function of the orientation of the guide vanes. However the invention also includes within its scope methods of power control wherein working fluid is bypassed from the inlet of the high pressure turbine 12. Temperature sensors 42 detect the average combustion temperature in combustor 11 and control the relative power conversion occurring in turbines 12 and 13 in conjunction with the fuel delivery rate from a hopper 45. The relative power conversion is governed by a motor 44 which adjusts vane-system 34 and by controlled valves 39 and 40. The control system described above is governed by a master control 47, which signals the required "set point" temperature and any change in the demanded power output. When a change in demanded power output is signalled, valve 43 adjusts the fuel feed rate from hopper 45 to the appropriate level (and optionally adjusts the "set point" temperature) and vane system 34 and/or valves 39 and 40 are adjusted in accordance with one of several possible control schemes described below.

A de-superheater 35 is connected between the evaporator and superheater tubes 22 and 23 and is made of variable effect by means of a control valve 36 by means of which the flow of feedwater to the de-superheater 35 can be varied or shut off. Preferably, a similar de-superheater 37 under the control of a control valve 38 is connected correspondingly between the evaporator and superheater sections 32 and 33 of the unit 19. De-superheaters 35 and 37 provide fine control of the steam temperature in turbine 25 and the associated ducting.

At steady load, the PFBC 11 is operated at constant temperature. This, preferably, is achieved by "set point" temperature control, utilising a multiplicity of temperature sensors (not shown) to measure the average gas temperature of the combustion products in the upper part of the PFBC 11 and using an error signal, produced when the average temperature varies from the demand or "set point" temperature, to adjust the fuel feed rate through the fuel feed line 15. The fuel feed rate adjustment may be effected in accordance with any of several known control schedules, such as those known as "P.", "P.I." and "P.I.D.", these initials standing for "proportional", "integral" and "derivative" respectively. The de-superheater 35 is similarly made to work to a "set point" temperature, namely that of the steam final exit temperature from the superheater tubes 23, as measured by temperature sensors (not shown) from which, in the event of a temperature departure from "set point", an error signal is derived which acts on the valve 36 to retore "set point" conditions.

There are several ways in which a change in power output can be initiated in anticipation of an increase or decrease in demanded electrical power. It will be understood that the following description relating to power increases also applies, mutatis mutandis, to decreases in required power.

Firstly, the fuel feed rate corresponding to the "set point" temperature for the PFBC may be temporarily increased by an amount which results in a small temperature increase known to be acceptable as a short-term temperature increase in the PFBC and associated components. The resulting increase in the gas temperature reaches the high-pressure turbine 12 after a delay of the order of minutes since the PFBC 11, hot clean-up unit 17 and the ducting connecting these to one another and to the turbine 12 have a volume which, typically, is comparable with the delivery flow of the compressor 14 during such a period. After this initial delay, the increased gas temperature increases the power output of the turbine 12 and the compressor 14 therefore increases in speed and passes an increased flow. The flow outpaces the high-pressure turbine flow acceptance, and thus the gas pressure in the PFBC 11 increases. At this pressure approaches the level required to meet the increased demand the fuel feed rate is placed once again under normal control (which now, of course, requires a greater fuel feed rate to maintain the set point temperature, in view of the increased gas mass flow rate in the PFBC 11). During the acceleration period of the high pressure turbine 12 and compressor 14, the power output of the low pressure turbine 13 can be controlled in accordance with any of several routines:

(1) Output from the generator 18 may be held substantially constant. This requires slight opening of the inlet guide vanes 34 of the low pressure turbine 13 when the increased inlet gas temperature reaches it, followed by further opening as the gas flow builds up with increasing pressurisation in the PFBC 11. As this increase in pressurisation nears completion, the inlet guide vanes 34 are closed to give the desired increased output from the turbine 13 and generator 18.

(2) If a control and stop valve 39 is provided to by-pass the high pressure turbine 12 as shown in FIG. 1, output from the generator 18 may be held substantially constant while maintaining an enhanced rate of pressure increase in the PFBC. This requires opening of the inlet guide vanes 34 to reduce the inter-turbine pressure and maximise the pressure drop across the high pressure turbine 12, accompanied by simultaneous partial opening of the bypass valve 39 to augment the flow through the low pressure turbine 13 and compensate for the reduced interturbine pressure.

(3) If the earliest possible partial increase in output from the generator 18 is required, this can also be achieved by combined adjustment of the inlet guide vanes 34 and the bypass valve 39. The increased electrical power is obtained at the expense of lower power from the high pressure turbine 12 and hence a longer time to achieve the required increase in pressure in the PFBC and the required total increase in electrical power.

(4) If the most rapid increase in pressurisation of the PFBC is required, for earliest availability of the full desired increase in power output from the generator 18, the bypass valve 39 is kept closed and the inlet guide vanes 34 are opened to their maximum extent to minimise the interturbine pressure and maximise the power of the high pressure turbine 12 and hence the rate of pressure increase in the PFBC. This results, however, in a sharp fall-off, of the order of 50%, in the output of the generator 18 until the new steady conditions are achieved.

Instead of biasing the fuel feed rate directly, as the means of initiating an increase in power, the temperature set point may be increased temporarily by a small amount known to be acceptable. This automatically results in an increase in the fuel feed rate, and after a time lag as described above the temperature increase reaches the gas turbines 12 and 13. The sequence of compressor acceleration and pressure increase in the PFBC occurs as is described above, and the same options (1), (2), (3) and (4) are available for controlling the low pressure turbine 13 and generator 18 in the period before the new steady conditions are achieved.

Yet a further way of initiating the required change is to increase the opening of the inlet guide vanes 34 so as to reduce the interturbine pressure, increase the pressure ratio across the turbine 12 and thereby increase its power and accelerate it and the compressor 14. This course initiates the required acceleration of the compressor and onset of the increase in pressure in the PFBC without any time lag due to the interval required for increased-temperature gas to travel from the PFBC to the high pressure turbine 12, but it does result in a decrease in the power of the low pressure turbine 13 and in the output of the generator 18, though this can be compensated (at the expense of increasing the time to complete the required change) by partially opening the bypass valve 39 to increase the flow in the low pressure turbine 13.

As already intimated, decreases in the required output level of the generator 18 can be initiated by reversing any of the above-described ways of initiating a power increase. Additionally, the achievement of a decrease in power can be speeded by the use of a bypass valve 40 across the low pressure turbine 13 if one is provided (as is also shown in FIG. 1).

The extent to which the output power from the generator 18 can be reduced while maintaining the bed temperature in PFBC 11 substantially constant is limited by the extent to which the mass flow of air through the PFBC can be reduced. FIG. 2 shows the compressor operating line when operating in the conditions of FIG. 1, namely with substantially constant combustion temperature and into a substantially constant choked swallowing capacity of the high pressure turbine 12. With a conventional fixed-geometry compressor, the characteristics would typically be bounded by a surge line such as A, (which represents unstable and therefore dangerous operation of the compressor) and in consequence it would not be allowable to run the compressor (and the high pressure turbine) down to below about 65% of full-load air flow, there the surge line crosses the operating line. Preferably, however, like the low pressure turbine 13 the compressor 14 is also provided with means for varying its performance characteristics, these being represented schematically in FIG. 1 as variable stator blading 41 at the compressor inlet (and/or at one or more interstage locations) and one or more valves 142 permitting a controlled degree of blowdown from one or more selected interstage points of the compressor. These variables, namely the settings of the stator blading 41 and of the control valve(s) 142, are automatically controlled in a predetermined way in dependence on a suitable independent variable (monitored by means not shown) such as compressor speed or gas pressure at the compressor exit, so as to modify the compressor performance at low output in such a way that instead of being governed by the high-speed surge line A defined by the family of constant speed lines (80%, 90%, 100% etc. shown in the diagram) it undergoes gradual modification to a low-speed surge line B, thus extending the area bounded by the operating line and the surge line, enabling the compressor to operate down to 40% or less of its full-load air flow. The smooth transition from surge line A to surge line B may be achieved, for example, by making the settings of the blading 41 and valve(s) 142 variable gradually over a range of compressor speeds between (as illustrated) about 88% and about 78% of the maximum running speed. Another possible way of controlling the blading and valve settings in dependence on compressor speed would be to sense rises and falls of speed through some particular value (say 80%) and use signals derived therefrom to trigger full adjustment of the blading and valve(s) from one end to the other of their ranges of adjustment.

Compressors with variable blading and valve settings are commonly used in conventional operating schemes for gas turbine power plant.

In the power plant according to the invention which is represented by FIG. 1, the steam turbine 25 and generator 26 may account for the major proportion of the generated power (though preferably for a substantially smaller proportion than the 80% or so which would be expected in a known proposal in which the power output is controlled by varying the combustion temperature within the fluidised bed and the air flow through the bed, from the compressor to the gas turbine, is made not substantially greater than that required stoichiometrically for combustion of the fuel): in another embodiment of power-generating plant made, and for operation, in accordance with the invention, as shown in FIG. 3 (in which corresponding components have the same reference numerals as in FIG. 1) the required cooling of the combustion bed 11' of the PFBC 11 is effected not by generating steam but by using air which is then fed to the gas turbine 12. In this embodiment, the steam turbine 25 and electrical generator 26 are still provided, but with the duty of abstracting heat only from the steam generated in the waste heat recovery unit 19. In the PFBC 11 of FIG. 3, the water tube evaporator and steam super-heater tubes 22 and 23 of the plant shown in FIG. 1 are replaced by the lower and upper sections 22' and 23' of an air-cooled tube system to which a part of the air delivered by the compressor 14 is suppied and from which such air, after being heated in the tube sections 22' and 23', is returned to the main part of the compressor delivery (after this has passed through the PFBC and the hot clean-up unit 17) and fed to the high pressure gas turbine 12. Corresponding to the control valve 36 of the plant shown in FIG. 1 is an air valve 36' (preferably under temperature "set point" control) which enables air to bypass the lower section 22' of the coolant tube system and be fed direct from the compressor 14 to the upper section 23', and by which the temperature of the air leaving the upper section 23' and of the bed 11' may be regulated.

Control of the plant represented by FIG. 3, to make it respond to, or anticipate, changes in output demand are essentially as already described in respect of the plant represented in FIG. 1, and accordingly no more detailed description of it will be required here.

In either of the above-described embodiments of the invention, the unreduced combustion temperature, even at reduced loads, gives an improved overall thermodynamic and thermal efficiency for the plant as compared with variable-temperature conventional operation; and the ability to select and then maintain a single combustion temperature enables performance to be optimised for different qualities of coal, petroleum residuals or other fuels with varying ash and corrosion properties. The maintenance of a constant combustion temperature also eases the problems of chemically neutralising corrosive fuels and controlling the nature of exhaust emissions to atmosphere. Although the mass flow rate of gas through the PFBC is made to vary under varying pressure conditions, the volumetric flow rate varies scarcely at all and the fluidisation velocity within the PFBC is maintained almost constant at an optimum level under varying load conditions. This is because the pressure drop across the high pressure turbine 12 is sufficiently high for its swallowing capacity (defined as $$\frac{M\sqrt{T_1}}{P_1}$$

where M is the mass flow rate, $T_1$ is the gas temperature at the turbine inlet and $P_1$ the gas pressure at the turbine inlet) to reach a constant limiting value. The turbine is said to be "choked" in this condition. Sine $T_1$ is constant and the volumetric flow rate is proportional to $M/P_1$, the fluidisation velocity of the gas through the fluidised bed is substantially constant.

We claim:
1. In a power plant of the type including:
 (a) a pressurized fluidized bed combustor provided with a combustion gas outlet and a compressed air inlet,
 (b) fuel supply means for delivering fuel to said pressurized fluidized bed combustor at a variable rate,
 (c) control means for controlling the delivery of fuel from the fuel supply means to the combustor in dependence upon the temperature in the combustor and tending to maintain said temperature at a pre-set demand value,
 (d) a high pressure gas turbine having an inlet which is connected to the combustion gas outlet of the combustor, said high pressure turbine having an outlet,
 (e) a low pressure gas turbine having an inlet which is connected to the outlet of said high pressure gas turbine,
 (f) means for varying the relative power outputs of said high and low pressure gas turbines,
 (g) an air compressor driven by the high pressure turbine for feeding compressed air to said compressed air inlet of said combustor, and
 (h) said plant generating an initial steady state power output in which an initial pressure and an initial temperature exist within said combustor,
 a method of changing the initial steady state power output of said plant to a new steady state power output in response to sustained load demand, comprising the steps of:
 (A) adjusting the initial pressure within said combustor in response to the sustained load demand by adjusting the relative power outputs of said high and low pressure gas turbines, said initial pressure adjusting step being performed by adjusting the fuel delivery rate to the combustor so as to keep the initial temperature in the combustor within predetermined safe limits, and
 (B) when said initial pressure has reached a predetermined value, adjusting the fuel delivery rate to the combustor so as to maintain a new equilibrium temperature within said combustor which is substantially equal to said pre-set demand temperature, said fuel feed adjusting step being performed dur- ing adjusting of the relative power outputs of said high and low pressure turbines so as to maintain a new steady-state pressure within said combustor, said new equilibrium temperature and said new steady-state pressure within the combustor corresponding to said new steady-state power output, whereby sustained major temperature changes are avoided.

2. A method as claimed in claim 1, wherein the initial pressure adjusting step is performed by orienting a variable orientation inlet-guide vane system at the inlet of the low pressure turbine, for adjusting the inter-turbine pressure and hence the relative power outputs of the high and low pressure turbines.

3. A method as claimed in claim 21, the initial pressure adjusting step being initiated by temporarily overriding said control means to alter the fuel delivery rate from said fuel supply means in the same sense as the required alteration in the initial steady state power output.

4. A method as claimed in claim 21, the initial pressure adjusting step being initiated by temporarily altering the pre-set demand temperature in the same sense as the required alteration in the initial steady state power output.

5. A method as claimed in claim 3; and further comprising the step of delaying changing the initial steady state power output by adjusting an inlet guide vane of the low pressure gas turbine in such a sense as to balance a change in the gas flow rate through said turbines and thereby to maintain the initial steady state power output of the power plant for a limited period.

6. A method as claimed in claim 4; and further comprising the step of delaying changing the initial steady state power output by adjusting an inlet guide vane of the low pressure gas turbine in such a sense as to balance a change in the gas flow rate through said turbines and thereby to maintain the initial steady state power output of the power plant for a limited period.

7. A method as claimed in claim 6; and further comprising the step of initially diverting some of the gas from the combustor from the inlet of the high pressure gas turbine to the inlet of the low pressure gas turbine by valve means.

8. A method as claimed in claim 22, the initial pressure adjusting step being initiated by temporarily overriding said control means to alter the fuel delivery rate from said fuel supply means in the same sense as the required alteration in the initial steady state power output; and further comprising delaying changing the initial steady state power output by initially varying the orientation of said inlet guide vane system in such a sense and to such an extent as to overcompensate for an initial change in the gas flow rate through said turbines.

9. A method as claimed in claim 2, said orienting step being initiated by opening said inlet guide vane system.

10. A method as claimed in claim 1; and further comprising the step of extracting heat from the combustor in which a thermodynamic fluid coolant loop is incorporated, driving a turbine, and controlling said loop so as to maintain the temperature of the heated fluid from said loop at a pre-set demand temperature during said change in the initial steady state power output.

11. A method as claimed in claim 10; and further comprising the step of incorporating a steam raising boiler controlled by a variable de-superheater in the loop.

12. A method as claimed in claim 10; and further comprising controlling said thermodynamic fluid coolant loop which is an air loop by bypass valve means, and connecting the air loop between the outlet of said compressor and the inlet of said high pressure gas turbine.

13. In a power plant of the type including:
(a) a pressurized fluidized bed combustor provided with a combustion gas outlet and a compressed air inlet,
(b) fuel supply means for delivering fuel to said pressurized fluidized bed combustor at a variable rate,
(c) control means including a temperature sensor for sensing temperature within the combustor, for controlling the delivery of fuel from the fuel supply means to the combustor in dependence upon the temperature sensed in the combustor, said control means being operative to maintain said temperature at a pre-set demand value,
(d) a high pressure gas turbine having an inlet which is connected to the combustion gas outlet of the combustor, said high pressure turbine having an outlet,
(e) a low pressure gas turbine having an inlet which is connected to the outlet of said high pressure gas turbine,
(f) means for varying the relative power outputs of said high and low pressure gas turbines,
(g) an air compressor driven by the high pressure turbine for feeding compressed air to said compressed air inlet of said combustor, and
(h) said plant generating an initial steady state power output in which an initial pressure and an initial temperature exist within said combustor,
an arrangement for changing the initial steady state power output of said plant to a new steady state power output in response to sustained load demand, comprising:
(A) means including a pressure control valve, for adjusting the initial pressure within said combustor in response to the sustained load demand for controlling the pressure control valve and thereby adjusting the relative power outputs of said high and low pressure gas turbines, said adjusting means including means for adjusting the fuel delivery rate to the combustor so as to keep the initial temperature in the combustor within predetermined safe limits; and
(B) means for adjusting the fuel delivery rate to the combustor when said initial pressure has reached a predetermined value by sensing the temperature within the combustor by the temperature sensor so as to maintain a new equilibrium temperature within the combustor which is substantially equal to said pre-set demand temperature, said fuel delivery rate adjusting means being operative during operation of the adjusting means for adjusting the relative power outputs of said high and low pressure turbines so as to maintain a new steady state pressure within the combustor, the new equilibrium temperature and the new steady state pressure within the combustor corresponding to the new steady state power output, whereby sustained major temperature changes are avoided.

14. The arrangement as claimed in claim 13, wherein said pressure adjusting means includes means for varying the inter-turbine pressure between the high and low pressure gas turbines.

* * * * *